Aug. 24, 1948.　　　　L. COLANER, SR　　　　2,447,898
AUTOMOBILE FENDER CONSTRUCTION
Filed March 20, 1947　　　　　　　　　　3 Sheets-Sheet 1
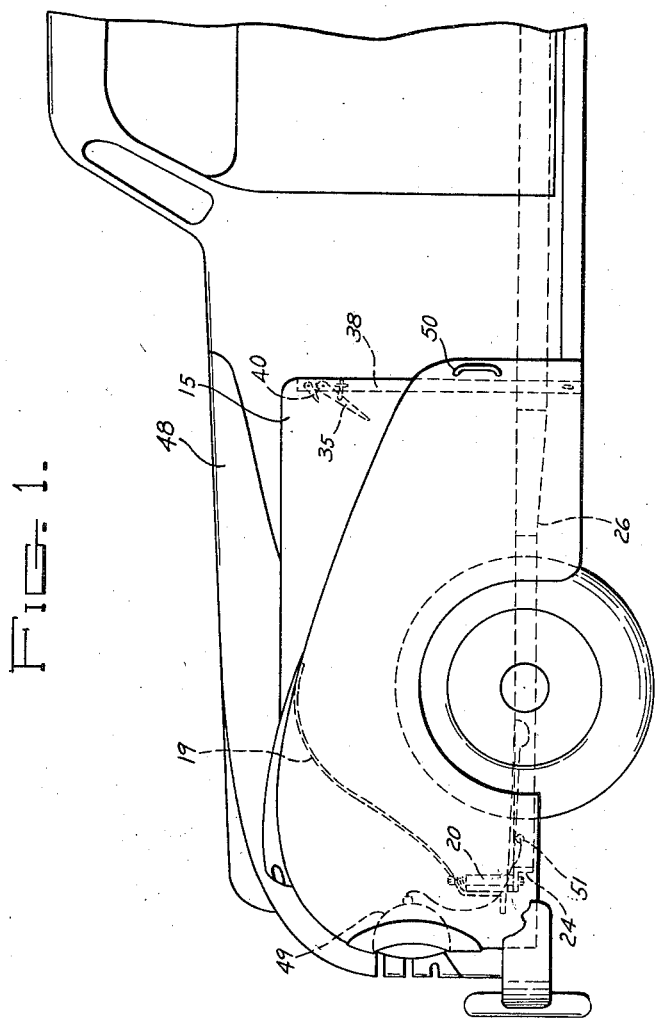
Louis Colaner
INVENTOR
BY Philip S. McBean
ATTORNEY Aug. 24, 1948.   L. COLANER, SR   2,447,898
AUTOMOBILE FENDER CONSTRUCTION
Filed March 20, 1947   3 Sheets-Sheet 2
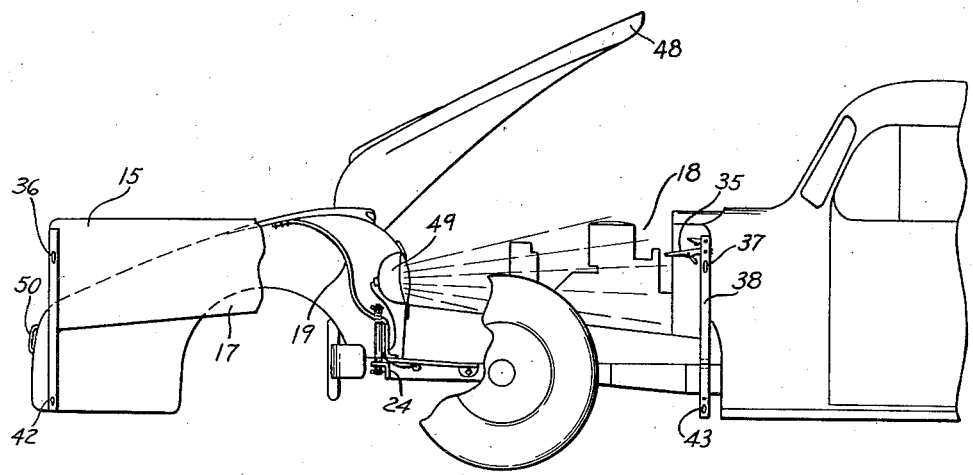
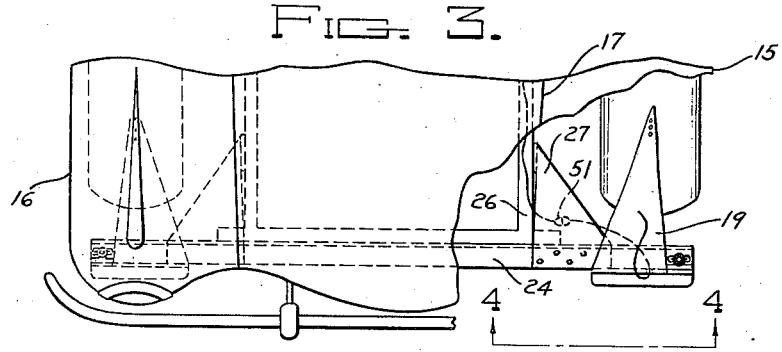
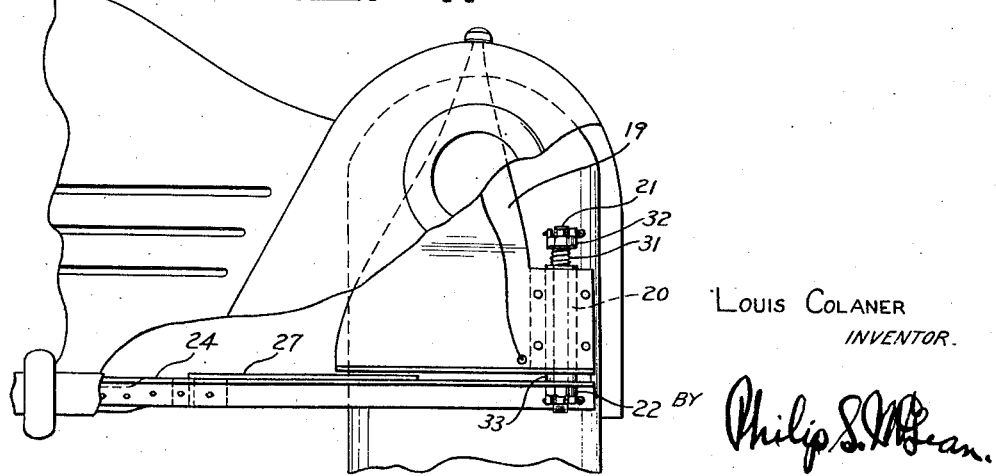
Louis Colaner
INVENTOR.
BY
ATTORNEY.

Aug. 24, 1948.    L. COLANER, SR    2,447,898
AUTOMOBILE FENDER CONSTRUCTION
Filed March 20, 1947    3 Sheets-Sheet 3
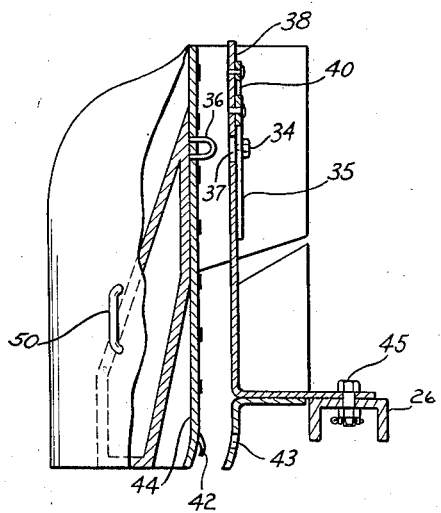
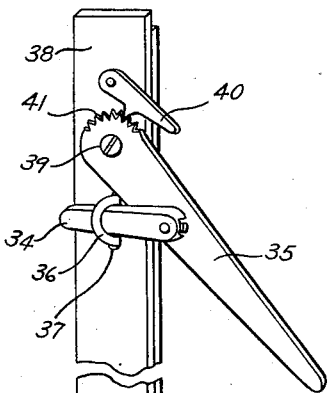
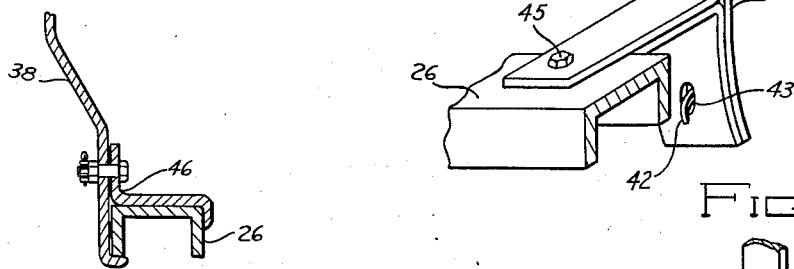
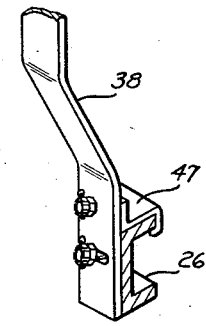
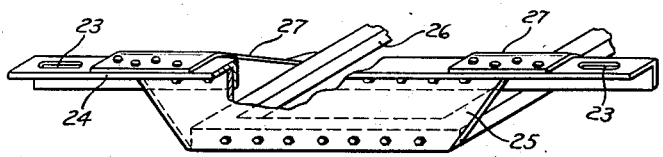
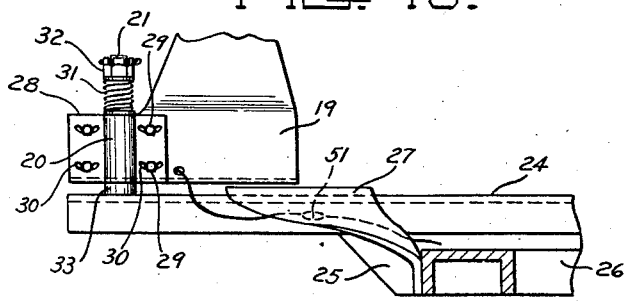
LOUIS COLANER
INVENTOR.
BY
ATTORNEY.

Patented Aug. 24, 1948

2,447,898

UNITED STATES PATENT OFFICE 2,447,898

AUTOMOBILE FENDER CONSTRUCTION

Louis Colaner, Sr., Freehold, N. J.

Application March 20, 1947, Serial No. 736,039

2 Claims. (Cl. 280—152)

The invention herein disclosed relates to the construction and mounting of automobile fenders.

General objects of the invention are to provide a fender construction which without departing from present styling practice, will afford access to engine and other parts which at present are largely obstructed or covered by the fenders.

Special objects of the invention are to enable the conversion of cars of modern design to attain the objects first stated.

Particular objects of the invention are to provide a practical construction which will hold the fenders firmly and safely in place and which will permit of the fenders being swung away from the sides of the car or, if desired, lifted clear off the car.

Related objects are to provide the means for accomplishing such results in a form which will be entirely concealed and out of the way but which will be fully accessible if the occasion requires.

Other objects of the invention are to enable adjustments being made to fit and maintain the fenders in proper, close engagement with the sides of the car body.

Further objects of the invention are to enable the utilization of the fenders to effect illumination of the engine or other parts within the body of the car.

Other desirable objects attained by the invention will appear in the course of the following specification.

The drawings accompanying and forming part of the specification illustrate certain present practical embodiments of the invention but structure may be modified and changed in various ways, all within the true intent and broad scope of the invention as hereinafter defined and claimed.

Fig. 1 in the drawings is a side elevation of the front end portion of an automobile equipped with the invention;

Fig. 2 is a broken side view showing one fender released and swung outwardly and forwardly, directing the light from the headlamp carried thereby, rearwardly into the engine compartment;

Fig. 3 is a broken plan view of the hood and fender portions of the car;

Fig. 4 is an enlarged broken front view of the fender structure appearing as on substantially the plane of line 4—4 of Fig. 3;

Fig. 5 is a broken sectional detail of the latch or lock mechanism for securing the free swinging end of the fender;

Fig. 6 is a broken part sectional and perspective view of the latch mechanism;

Figs. 7 and 8 are broken sectional and perspective views of different forms of uprights for carrying the latch mechanism;

Fig. 9 is a broken part sectional perspective view of a form of cross member for carrying the pivot studs for the fenders;

Fig. 10 is a broken detail of an angularly adjustable mounting for the fenders.

In the illustration, the front fenders 15 and 16 of the car shown are of usual or typical design, lying close to the car body and having upright inner walls 17 covering and closing in the sides of the motor compartment 18.

In the present disclosure these fenders are modified to the extent of having brackets 19 attached to the under sides of the same, at the front, and carrying upright sleeves 20 pivotally engaged on substantially vertical studs 21.

These studs are shown secured by nut and cotter pin fastenings 22 in the slots 23, Fig. 9, of a cross bar 24 secured by mounting plate 25 on the front cross member of the frame 26, and embraced in that relation by brackets 27.

This construction permits of any lateral adjustment required to set the pivot studs in position where the fenders will swing in close and fit tightly against the sides of the body and frame.

In addition to the lateral adjustment described, provision may be made for tilting or angular adjustment of the fenders to fit the body, by a construction like that shown in Fig. 10, where the pivot sleeve 20 is shown as having a plate 28 attached thereto and which is connected with the fender carrying bracket 19 by bolts 29 in arcuate slots 30. On loosening these bolts the fender may be rocked one way or the other to make it hug the side of the body, where it will then be held on tightening such bolts.

To prevent rattling, springs 31 are shown on the pivot studs 21 above the fender mounting sleeves 20, held by cotter pin and nut fastenings 32. Bearing washers 33 are indicated on the studs at the lower ends of the sleeves.

To hold the rearward, free swinging ends of the fenders safely and securely, special fastenings are provided consisting, in the illustration, of wedge keys or pins 34 pivotally carried by levers 35 in position to extend through hasps 36 projecting inward from the fenders through slots 37 in the uprights 38 on which the levers are mounted, Figs. 5 and 6.

The securing levers 35 are shown pivotally supported at 39 on the uprights 38 and as locked in their securing positions by pivoted latch levers 40, toothed to engage notches 41 in the pivotal head portions of the securing levers.

Additionally the fenders are shown as secured at the bottom by hooks 42 designed to extend through keeper openings 43 in the lower ends of the upright bars 38. These hooks 42 and the hasps or staple loops 36 are shown as carried by upright bars 44 attached to the inner sides of the fenders.

The bars 38 carrying the fender securing wedges 34 and hooks 42, may be mounted on the frame 26 as by through bolts 45, Figs. 5 and 6, or by clamps such as indicated at 46 and 47, Figs. 7 and 8, designed to wholly or partly embrace the side members of the frame, the mounting of such parts depending to an extent upon the particular design and construction of the car body and frame.

The fender securing levers 35 and latches 40 are shown as located within the engine compartment, where they can be reached only after the hood 48 is opened, as in Fig. 2. Thus the fender securing means is safe against unauthorized tampering.

When, however, the hood is unlocked and opened, the latches 40 are accessible and can be quickly released to permit the handle levers 35 being pulled to withdraw the locking wedges 34. Then with a slight lifting movement on the fender the hook 42 may be released from slot 43 and the fender swung outwardly and forwardly on its pivot stud, either part-way or to a fully reversed position such as shown in Fig. 2.

In the latter instance the headlamp 49 will shine rearwardly and may be used to illuminate the engine compartment or other parts to the rear.

To facilitate manipulation of the fender, a hand grip or grips 50 may be provided on the outer, rearward end portion of the fender.

If space at the side of the car is limited so that the fender cannot be swung outward as much as desirable, the entire fender can be taken off by first unlocking it at the rearward end as described, and then, after removing the cotter pin and nut fastening 32, lifting the fender straight up off the pivot stud 21.

To permit of such removal, the wiring of the headlamps may be equipped with quick detachable couplings 51, Figs. 3 and 10, which can be disconnected to permit lifting the fenders off the pivot studs and then, if light is required, be reconnected with the fender in a position to throw the light from the headlamp onto the work.

The wedge and hook fastenings tend to automatically tighten with vibration, thus to hold the fenders snugly in place. The engaging parts may be stripped with rubber, felt or the like to prevent rattle and noise. The cross bar carrying the pivot studs forms a secondary bumper bar on the front cross member of the frame, strengthening and protecting the parts to this additional extent.

The fenders are not marred or even changed in appearance, except, possibly, by the addition of the hand grips 50, which need not be objectionable in appearance.

The fenders, therefore, serve their full useful and ornamental purposes. They cover and protect the engine at the sides in their normal position; but they may be quickly opened outward or removed to entirely uncover the engine at the sides.

If the inner apron or vertical wall 17 of the fender is so deep as to require it, the fender may be lifted bodily to any necessary extent to clear the wheel, as it is being swung outwardly away from the body.

In the opened position shown in Fig. 2, the fenders fully expose the front wheels, brakes, knee actions, axle and other parts requiring attention and servicing.

What is claimed is:

1. In an automobile having a frame structure, an engine hood, wheel fenders at the sides of the hood and forwardly directed headlights on the fenders, said fenders being separate from the hood and said hood being hinged at one end enabling it to be raised independently of the fenders, upstanding pivot studs on the front end of the frame at opposite sides of the same, bearings on the fenders pivotally engaged on said pivot studs, said bearings being disposed at the front ends and toward the outer edges of the fenders enabling them to be swung outwardly and forwardly into substantially completely reversed relation so that the headlights carried thereby will be directed inwardly toward engine parts normally covered by the hood, and quick releasable means for securing the rearward ends of the fenders in normal position at the sides of the hood.

2. In an automobile having a frame structure, an engine hood, wheel fenders at the sides of the hood and forwardly directed headlights on the fenders, said fenders being separate from the hood and said hood being hinged at one end enabling it to be raised independently of the fenders, vertical pivot means mounting the forward ends of the fenders on the forward end at opposite sides of the frame structure and at the outer edge thereof enabling them to be swung outwardly and forwardly into substantially completely reversed relation with the headlights carried thereby directed inwardly toward engine parts normally covered by the hood, means for securing the rearward ends of the fenders in normal position at the sides of the hood, said means being so constructed and arranged as to permit quick release thereof, said vertical pivot means being so constructed and arranged as to be readily separable to permit quick removal of a fender from the frame structure, and electrical connections to the headlights including couplings disconnectable for enabling quick complete separation of a removed fender.

LOUIS COLANER, Sr.

REFERENCES CITED

The following references are of record in the file of this patent:

UNITED STATES PATENTS

| Number | Name | Date |
| --- | --- | --- |
| 1,795,208 | Garner | Mar. 3, 1931 |
| 2,157,793 | Lang | May 9, 1939 |
| 2,413,792 | Sharp | Jan. 7, 1947 |